United States Patent [19]
Burov et al.

[11] 4,013,415
[45] Mar. 22, 1977

[54] PLASMA-CHEMICAL REACTOR FOR TREATMENT OF DISPERSE MATERIALS

[76] Inventors: Igor Sergeevich Burov, ulitsa Yakuba Kolosa, 39, kv. 48; Vladimir Vladimirovich Bysjuk, ulitsa Ostrovskogo, 27, kv. 56; Alfred Lvovich Mosse, Leninsky prospekt, 72a, kv. 66; Leonid Stepanovich Shkurko, ulitsa Pulikhova, 35, kv. 1; Vyacheslav Andreevich Vashkevich, ulitsa Mendeleeva, 7, kv. 71, all of Minsk, U.S.S.R.

[22] Filed: June 7, 1974

[21] Appl. No.: 477,336

[52] U.S. Cl. .......................... 23/252 R; 219/121 P
[51] Int. Cl.² ............................................ B01J 1/00
[58] Field of Search ............ 23/284, 252 R, 277 R; 219/121 P; 250/543, 544; 75/.5 B, .5 BA, .5 BB, .5 BC

[56] References Cited

UNITED STATES PATENTS

| 3,171,714 | 3/1965 | Jones et al. .................... 75/.5 B |
| 3,323,888 | 6/1967 | Searight et al. ............ 219/121 P X |
| 3,541,297 | 11/1970 | Sunnen et al. ................ 219/121 P |
| 3,764,272 | 10/1973 | Sterling ...................... 219/121 P X |
| 3,830,997 | 8/1974 | Essers et al. ................ 219/121 P X |
| 3,923,467 | 12/1975 | Bonet et al. ...................... 23/293 A |

OTHER PUBLICATIONS

TAFA Chemical Bulletin, 54-A5, TAFA Division, Humphreys Corp. 180 N. Main Street, Concord, New Hampshire 03301.
TAFA Bulletin P64/68, TAFA Division, Humphreys Corp. 180 N. Main Street, Concord, New Hampshire 03301.

Primary Examiner—Joseph Scovronek
Attorney, Agent, or Firm—Fleit & Jacobson

[57] ABSTRACT

A plasma-chemical reactor for treatment of disperse materials comprises a vertical working chamber. The top portion of the working chamber includes means to feed the disperse material into the reactor. The working chamber is provided with means for feeding and plasma-heating process gas, said means being a number of plasmatrons the nozzles of which are arranged along the periphery of the working chamber bottom portion and directed essentially at a right angle to the working chamber vertical axis. The reactor also includes means for evacuating gaseous products from the working chamber and a bin located under the working chamber and communicating with the bottom portion thereof.

12 Claims, 7 Drawing Figures

PLASMA-CHEMICAL REACTOR FOR TREATMENT OF DISPERSE MATERIALS

This invention relates generally to equipment for running physical and chemical processes that involve the use of low-temperature plasma, and is concerned with plasma-chemical reactors for treatment of disperse materials.

The disclosed herein reactor can find application mostly for carrying out chemical reactions in low-temperature plasma, as well as for the treatment of disperse materials with the purpose of spheroidization thereof, for producing ultra-disperse powders and for plasma-spraying of high-melting and other metals.

One prior-art plasma-chemical reactor is known for use in the treatment of disperse materials, i.e., for carrying out chemical processes in a suspended bed, comprising a vertical working chamber in whose top portion are located the means for feeding the disperse material, while located in its bottom portion are the means for heating the process gas and feeding it into the working chamber, said means being made as a jet-type plasmatron arranged along the axis of the working chamber. The reactor is also provided with a bin.

The process gas heated in the jet-type plasmatron is fed into the working chamber from the bottom. The disperse material is fed into the working chamber from the top by a feeding means and is subjected to the effect of the plasma jet of the process gas at an average mass temperature from 3000° to 5000° K.

The gaseous products resulting from the interaction of the disperse material with the process gas are withdrawn through the means adapted for this purpose, while the solid phase is discharged into the bin.

This reactor, however, suffers from several disadvantages such as its being unsuitable for treating high-melting disperse materials and disperse materials which, on being heated, are liable to form molten particles or fluid slags, as the latter might get into the plasmatron nozzle and thus disturb its normal functioning.

Besides, the known reactor cannot be used to treat disperse materials with the purpose of spheroidization or spray-deposition as this is likewise accompanied by the formation of molten particles which are likely to get into the plasmatron nozzle.

It is therefore an essential object of the present invention to provide a high-intensity plasma-chemical reactor which enables the treatment of disperse materials that are liable, when heated to form, as a result of physical and chemical transformations, gaseous liquid and solid products, including high-melting disperse materials and low thermal conduction disperse materials.

This object is accomplished by providing a plasma-chemical reactor for treatment of disperse materials comprising a vertical working chamber, means for feeding a disperse material into said chamber located in the top portion thereof, means for plasma-heating of the process gas and feeding it into the bottom portion of the working chamber, means for withdrawing gaseous products from the working chamber as well as a bin located under the working chamber and communicating with the bottom portion thereof. According to the invention the means for plasma-heating of the process gas and its feeding are in effect a number of plasmatrons whose nozzles are arranged along the periphery of the working chamber bottom portion and are directed essentially at right angles to the working chamber vertical axis.

The means for withdrawal of gaseous products may be located in the top portion of the working chamber.

The bin may be provided with means for withdrawal of gaseous products.

The working chamber may communicate with the bin through a connector sleeve, whereas the means for withdrawal of gaseous products from the bin may be made as another sleeve embracing the connector sleeve, thereby ensuring external heating of the latter by virtue of waste gaseous products.

Provision may be made in the top portion of the working chamber for a plasma heating device adapted to heat the disperse material fed into the working chamber.

This plasma heating device may be made as a coaxial plasmatron with a hollow central electrode adapted for the disperse material to be fed through.

Otherwise, the plasma heating device may be made as a mixing chamber with radially arranged plasmatrons.

The means for withdrawing gaseous products from the working chamber may be made as outlets arranged in between the plasma heating device and the plasmatrons at two levels.

The term "disperse material" means either liquid or solid particles of the material under treatment and also their vapour.

The term "process gas" means a gas or a mixture of gases, a liquid or a mixture of liquids or a mixture of gases and liquids heated in the plasmatrons.

The term "gaseous products" means the process gas and the products of its physical and chemical transformations as well as a mixture of the process gas and the products of its physical and chemical transformations with the products of the physical and chemical transformations of the material under treatment that are in the gaseous phase.

The proposed plasma-chemical reactor using as the means for plasma-heating and feeding of the process gas a number of plasmatrons arranged along the periphery of the working chamber bottom portion is advantageous in being simple in construction and is applicable for treatment of diverse disperse materials with a view to carrying out plasma-chemical reactions, spheroidization, spray-deposition and producing ultra-disperse powders, as well as for treatment of materials which, when heated, are liable to form molten particles or fluid slags of high-melting disperse materials and those possessing low thermal conduction.

Further advantages of the proposed reactor will hereinafter become apparent from a consideration of a detailed disclosure of its functioning to be had in conjunction with the accompanying drawings, wherein.

Figure 1:
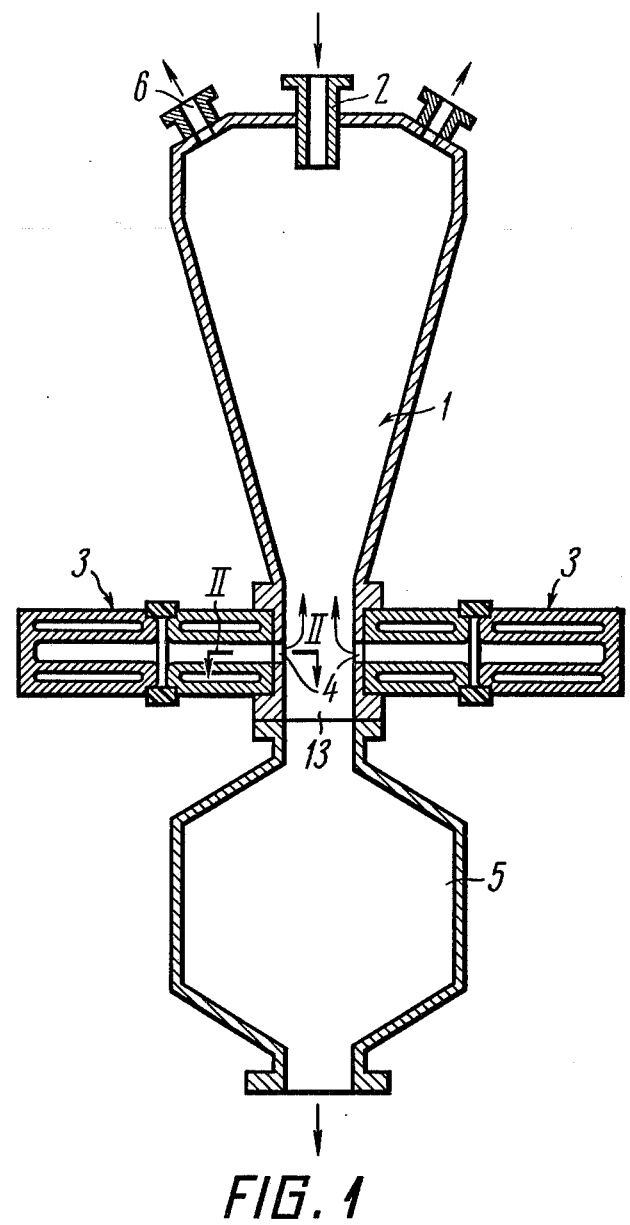
FIG. 1 is a longitudinal-section view of a plasma-chemical reactor for treatment of disperse materials according to the invention.

Reference being now directed to the accompanying drawings, FIG. 1 illustrates a working chamber of the plasma-chemical reactor for treatment of disperse materials. In its top portion the working chamber 1 has means for feeding the disperse material, said means being made as a sleeve. The working chamber 1 also has means for feeding and plasma-heating of the process gas, said means being made as a number of plasmatrons 3 with their nozzles 4 arranged along the periphery of the bottom portion of the working chamber 1 and directed essentially at right angles to the vertical axis of the working chamber 1. The bottom portion of the working chamber 1 communicates with a bin 5. Provision is made in the top portion of the working chamber 1 for means to withdraw gaseous products therefrom, said means being made as outlets 6. The plasmatron 3 is arranged on the periphery of the bottom portion of the working chamber 1 in the following way.

Figure 2:
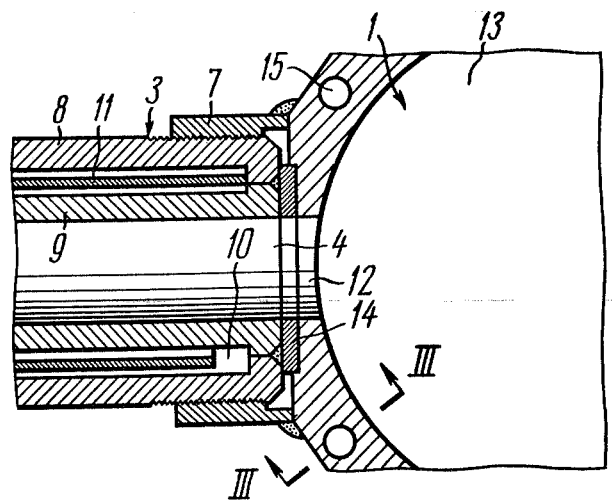
FIG. 2 is a section taken on the line II—II in FIG. 1.

A socket 7 (FIG. 2) is welded to the wall of the working chamber 1 into which socket is threaded a housing 8 for an electrode 9 of the plasmatron 3, the electrode 9 being welded to the housing 8. A channel is provided in the electrode 9 which serves essentially as the nozzle 4. A deflector 11 is provided in a gap 10 in between the housing 8 and the electrode 9 and is adapted for guiding the heat-removing agent.

Figure 3:
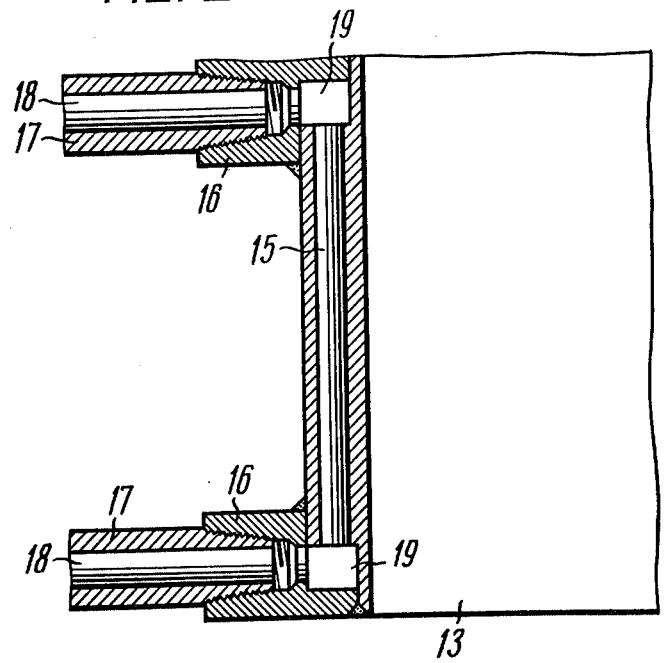
FIG. 3 is a section taken on the line III—III in FIG. 2.

A hole 12 is made in the wall of the working chamber 1 coaxial with the nozzle 4, whereby the latter is in communication with a channel 13 (FIGS. 1, 2) in the bottom portion of the working chamber 1. An annular gasket 14 is interposed between the housing 8 (FIG. 2) and the wall of the working chamber 1. Channels 15 (FIGS. 2, 3) are provided in the wall of the working chamber 1 for heat-removing agent to pass. To feed said heat-removing agent into and withdraw it from the channels 15, flanges 16 (FIG. 3) are welded to the wall of the working chamber 1 into which nipples 17 are threaded having channels 18. The channels 18 of the nipples 17 communicates with annular passageways 19 and with the vertical channels 15 provided in the wall of the working chamber 1.

Figure 4:
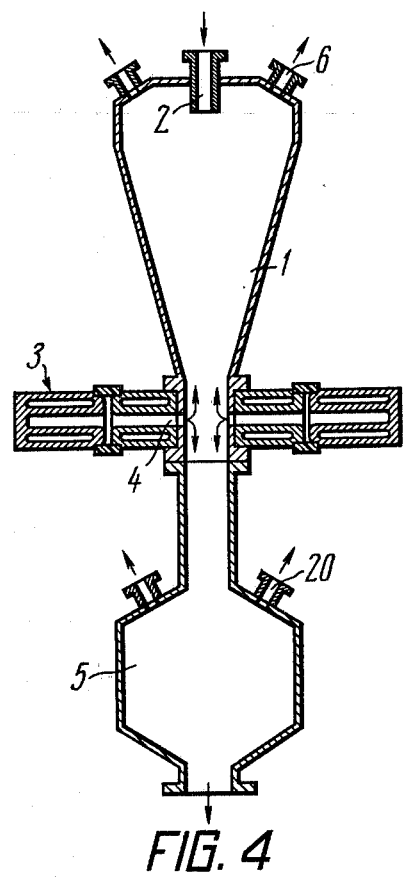
FIG. 4 is a longitudinal-section view of another embodiment of a plasma-chemical reactor for treatment of disperse materials according to the invention.

The bin 5 may be provided with means for withdrawing gaseous products made as outlets 20 (FIG. 4).

The working chamber 1 may be interconnected with the bin 5 via a connector sleeve 21 (FIG. 5), while the means for withdrawing gaseous products from the bin 5 may be made as a sleeve 22 surrounding the sleeve 21.

Figure 6:
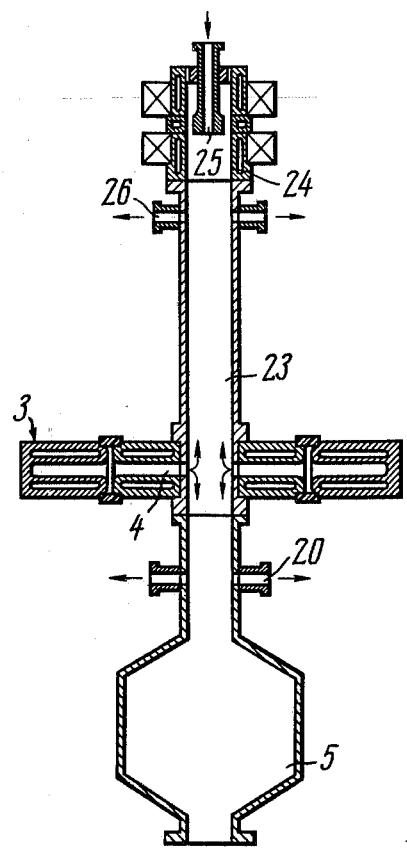
FIG. 6 is a longitudinal-section view of still another embodiment of a plasma-chemical reactor for treatment of disperse materials according to the invention.
Figure 7:
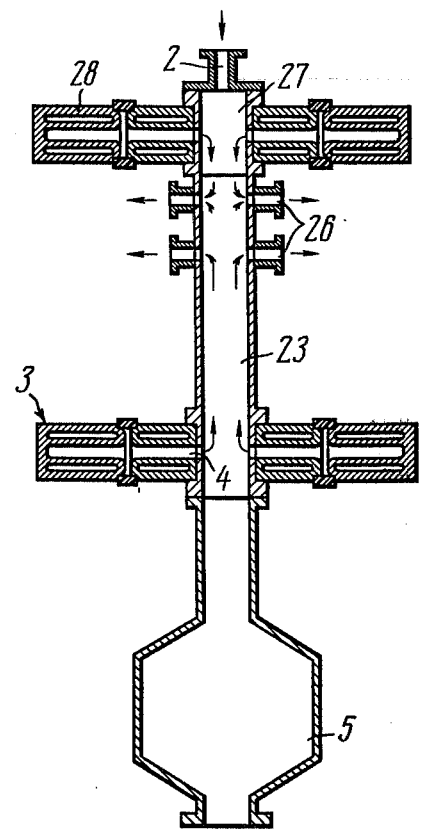
FIG. 7 is a longitudinal-section view of yet another embodiment of a plasma-chemical reactor for treatment of disperse materials.

Located in the top portion of the working chamber may be a plasma heating device in a manner similar to a working chamber 23 (FIG. 6). The plasma heating device is a coaxial plasmatron 24 with a hollow central electrode 25 adapted for heating the disperse material fed into the working chamber 23. Provided in between the coaxial plasmatrons 24 and the plasmatrons 3 are means for withdrawing gaseous products from the working chamber 1, made as outlets 26 which may be arranged at two levels as shown in FIG. 7.

The plasma-chemical reactor may also have a plasma heating device made as a mixing chamber 27 with radially arranged plasmatrons 28.

The plasma-chemical reactor for treatment of disperse materials operates as follows.

The disperse material to be treated is fed at a required rate through the sleeve 2 (FIG. 1) into the working chamber 1, into which is also fed through the nozzles 4 the process gas heated in the plasmatrons 3. The process gas is fed from below upward to heat the disperse material which is fed in counterflow. The process gas is then withdrawn through the outlets 6. The disperse material, while moving downward, undergoes some physical and chemical transformations. When in the working chamber 1, the disperse materials may vaporize and decompose, and the products of its evaporation and decomposition are vented out along with the process gas through the outlets 6. Molten particles of the disperse material and/or slag pass through the bottom portion of the working chamber 1 into the bin 5 and are disposed of either continuously or periodically.

The embodiment of the plasma-chemical reactor for treatment of disperse materials discussed herein is advantageous in that, due to arrangement of the plasmatrons 3 along the periphery of the bottom portion of the working chamber 1, molten slag is free to run down the walls of the chamber 1 as fast as it is formed thus not interfering with the disperse materials under treatment or with the operation of the plasmatrons 3.

When treating a disperse material in the plasma-chemical reactor represented in FIG. 4, the process gas from the plasmatrons 3 is partly fed to the top portion of the working chamber 1 to heat the disperse material fed in counterflow to the required temperature, say, to a temperature high enough to vaporize moisture and/or volatile components from the disperse material. The moisture and/or volatiles are vented from the working chamber 1 together with the part of the process gas passing upward, through the outlets 6. The heated disperse material free from moisture and/or volatiles is subjected to further treatment in a co-current stream formed by the remaining part of the process gas which moves downward and is vented through the outlets 20 provided in the bin 5.

Application of the embodiment of the plasma-chemical reactor illustrated in FIG. 4 makes it possible to divide the flow of the process gas into two streams each of which carries different products of the disperse material treatment. This enables the possibility of attaining a higher concentration of the gaseous products in the stream thereby making their isolation simpler and less expensive.

Figure 5:
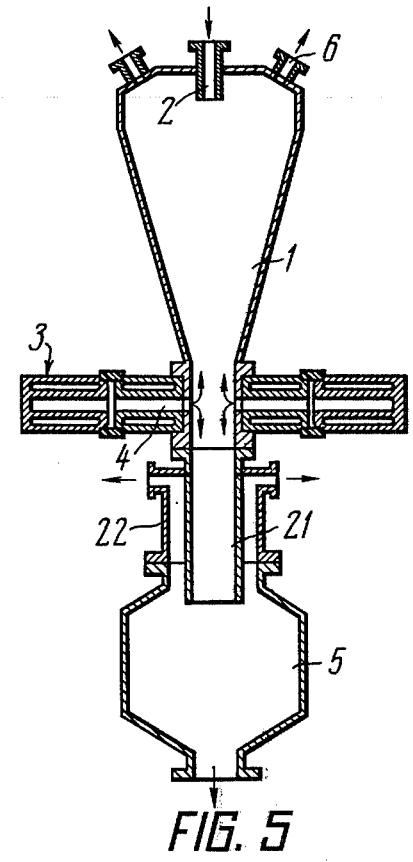
FIG. 5 is a longitudinal-section view of one more embodiment of a plasma-chemical reactor for treatment of disperse materials according to the invention.

Treatment of the disperse material can also be carried out in the plasma-chemical reactor embodiment shown in FIG. 5.

In this case the flow of high-temperature process gas heated in the plasmatrons 3 and gaseous products passing into the bin 5 are in contact with the inside walls of the connector sleeve 21 to maintain the temperature of the inside walls at a reasonably high level, say, above the melting point of the material under treatment. Thus, heat losses on the walls of the plasma-chemical reactor are reduced, while the high temperature of the stream of the process gas is retained over a great length of the reaction zone, whereby the effectiveness of the plasma-chemical reactor as a whole is increased. Besides, molten slag or disperse material contacting the hot inside wall of the connector sleeve 21 does not solidify on the wall but easily runs down into the bin 5.

When using the plasma-chemical reactor for treatment of disperse materials as shown in FIG. 6, the disperse material is preheated in a plasma heating device after being fed thereinto by feeding means comprising the hollow electrode 25, said heating device being the coaxial plasmatron 24. The disperse material is then fed into the working chamber 23 wherein the disperse material, while flowing in a co-current stream of the high-temperature process gas established by the coaxial plasmatron 24, is heated and acquires higher flow velocity. When the disperse material is heated moisture and/or volatile components which may be removed from the disperse material are withdrawn together with the stream of the process gas from the working chamber 23 through the outlets 26.

The temperature of the stream of process gas withdrawn from the outlets 26 should be higher than the temperature to which the disperse material is to be heated so as to be free from moisture and/or volatiles.

A negligible portion of the process gas heated in the plasmatrons 3 is fed from the bottom portion of the working chamber 23 upward against the flow of the disperse material heated and accelerated by the stream of the process gas established by the coaxial plasmatron 24, whereupon said portion of the process gas is withdrawn through the outlets 26. The heated disperse material moves downward in the co-current stream of high-temperature process gas formed by the remaining part of the process gas heated in the plasmatrons 3. When further heated, the disperse material, now free from moisture and/or volatiles, undergoes physico-chemical transformations which result, in the most general case, in formation of gaseous, liquid and solid products, as well as slags.

The co-current stream of gas imparts energy to the disperse material being heated and to the walls of the bottom portion of the working chamber 23 and those of the bin 5 whereby the temperature of said co-current gas stream drops substantially. The minimum temperature of the co-current gas stream within the zone of formation of the end products should be higher than the optimum temperature to which the disperse material is to be heated.

The co-current gas stream is vented out together with the gaseous products through the outlets 20 while slag or solid and liquid products are passed into the bin 5 wherefrom they are disposed of either continously or periodically.

Along with the advantages attained due to division of the gas flow, application of the embodiment of the plasma-chemical reactor shown in FIG. 6 makes it possible to extend the high-temperature zone and introduce the preheated disperse material into the working chamber 23 at a velocity required for the process of treatment which is attained due to acceleration of the particles of the disperse material in the co-current stream of the process gas heated in the coaxial plasmatron 24. The use of a plasma heating device made as the coaxial plasmatron 24 enables the required control over the relationship between the temperature and flow velocity of the process gas over the entire path of the disperse material under treatment.

One further embodiment of the plasma-chemical reactor for treatment of disperse materials as shown in FIG. 7 operates as follows.

The process gas is heated in the plasmatrons 28 and fed into the mixing chamber 27. Concurrently, the disperse material is fed through the sleeve 2 into the mixing chamber 27 to be intermixed there with the stream of high-temperature gas formed by the process gas heated in the plasmatrons 28.

Then the high-temperature gas stream is directed into the top portion of the working chamber 23. While passing through the mixing chamber 27 and through the top portion of the working chamber 23 the disperse material is heated by the high-temperature gas stream. The high-temperature gas stream carrying gaseous products resulting from heating of the disperse material is withdrawn through the outlets 26 arranged at the higher level.

The whole of the process gas heated in the plasmatrons 3 is directed upward in a counterflow to the disperse materials heated and accelerated in the co-current stream of the process gas established in the mixing chamber 27. The stream of the process gas heated in the plasmatrons 3 together with the gaseous products resulting from further heating of the disperse material is vented largely through the outlets 26 arranged at the lower level. The remaining negligible portion of the flow of process gas and gaseous products is withdrawn through the outlets 26 arranged at the higher level.

Application of the embodiment of the plasma-chemical reactor shown in FIG. 7, along with the advantages gained due to a separate outlet for the streams and an extended high-temperature zone, is instrumental also in providing the required flow velocity of the disperse material at the inlet of the counterflow stream of the process gas and thereby in providing optimum heating condition for the disperse material.

Withdrawal of the entire stream of the process gas heated in the plasmatrons 28 and the stream of the process gas heated in the plasmatrons 3 through the outlets 26 enables the temperature of the streams to be reduced at the outlet of the working chamber 23. In this case the temperature of the streams may be but slightly higher than that of the disperse material within the zone of said outlets 26 which reduces loss of energy with the waste gas and thus increases the efficiency of the plasma-chemical reactor.

The use of the coaxial plasmatron 24 (FIG. 6) is favourable at low feed rates of the disperse material, Viz., of the order of several scores of kilograms per hour, when preheating of the disperse material does not involve much energy expense.

The use of the mixing chamber 27 (FIG. 7) is advantageous in case of higher feed rates of the disperse material, viz., of the order of hundreds and thousands of kilograms per hour, when preheating of the disperse material requires much energy expense.

Concurrent utilization of the mixing chamber 27 with the plasmatrons 28 and the means for plasma heating made as a number of plasmatrons 3 arranged along the periphery of the bottom portion of the working chamber 23 makes it possible to control within a broad range the energy supply into the working chamber 23 and vary the ratio between the amount of the process gas and of the energy supplied by te plasmatrons 28 and the plasmatrons 3 into the working chamber 23.

What is claimed is:

1. A plasma-chemical reactor for treatment of disperse materials, with a process gas comprising: a vertical working chamber; means for feeding the disperse materials into the top portion of said working chamber; a plurality of plasmatrons for plasma-heating of the process gas, said plasmatrons having nozzles arranged around and joined with the periphery of the bottom portion of said working chamber and directed generally at right angles to the vertical axis of said working chamber for feeding process gas directly into the bottom portion of said working chamber; means for withdrawing gaseous products from said working chamber at a location above the nozzles of said plasmatrons; and a bin connected to and located directly under said working chamber and communicating directly therewith.

2. A plasma-chemical reactor as claimed in claim 1, wherein said means for withdrawing gaseous products are located in the top portion of said working chamber.

3. A plasma-chemical reactor as claimed in claim 1, further comprising means to withdraw gaseous products from said bin.

4. A plasma-chemical reactor as claimed in claim 2, further comprising means to withdraw gaseous products from said bin.

5. A plasma-chemical reactor as claimed in claim 3, which further comprises a connector sleeve communicating said working chamber with said bin, and another sleeve surrounding said connector sleeve and serving as said means for withdrawing gaseous products from said bin, thus ensuring external heating of said connector sleeve by virture of waste gaseous products.

6. A plasma-chemical reactor as claimed in claim 4, which further comprises a connector sleeve communicating said working chamber with said bin, and another sleeve surrounding said connector sleeve and serving as said means for withdrawing gaseous products from said bin, thus ensuring external heating of said connector sleeve by virture of waste gaseous products.

7. A plasma-chemical reactor as claimed in claim 3, further comprising a plasma heating device located in the top portion of said working chamber for heating the disperse material fed into said working chamber.

8. A plasma-chemical as claimed in claim 7, further comprising outlets interposed between said plasma heating device and said plasmatrons at two different levels and serving as said means for withdrawing gaseous products from said working chamber.

9. A plasma-chemical reactor as claimed in claim 7, further comprising a coaxial plasmatron serving as said plasma heating device arranged along the axis of said working chamber and having a hollow central electrode for the disperse material to be fed therethrough.

10. A plasma-chemical as claimed in claim 8, further comprising a coaxial plasmatron serving as said plasma heating device arranged along the axis of said working chamber and having a hollow central electrode for the disperse material to be fed therethrough.

11. A plasma-chemical reactor as claimed in claim 7, further comprising a mixing chamber located in the top portion of said working chamber and communicating therewith and a number of plasmatrons arranged radially with respect to said mixing chamber to form along therewith said plasma heating device.

12. A plasma-chemical reactor as claimed in claim 8, further comprising a mixing chamber located in the top portion of said working chamber and communicating therewith and a number of plasmatrons arranged radially with respect to said mixing chamber to form along therewith said plasma heating device.

* * * * *